Feb. 20, 1934.  F. A. FIRESTONE ET AL  1,948,104
VIBRATION RESPONSIVE APPARATUS
Filed Oct. 24, 1929  2 Sheets-Sheet 1

INVENTORS
Floyd A. Firestone
Ernest J. Abbott and
Howard B. Vincent
by
THEIR ATTORNEY.

Feb. 20, 1934.  F. A. FIRESTONE ET AL  1,948,104
VIBRATION RESPONSIVE APPARATUS
Filed Oct. 24, 1929  2 Sheets-Sheet 2
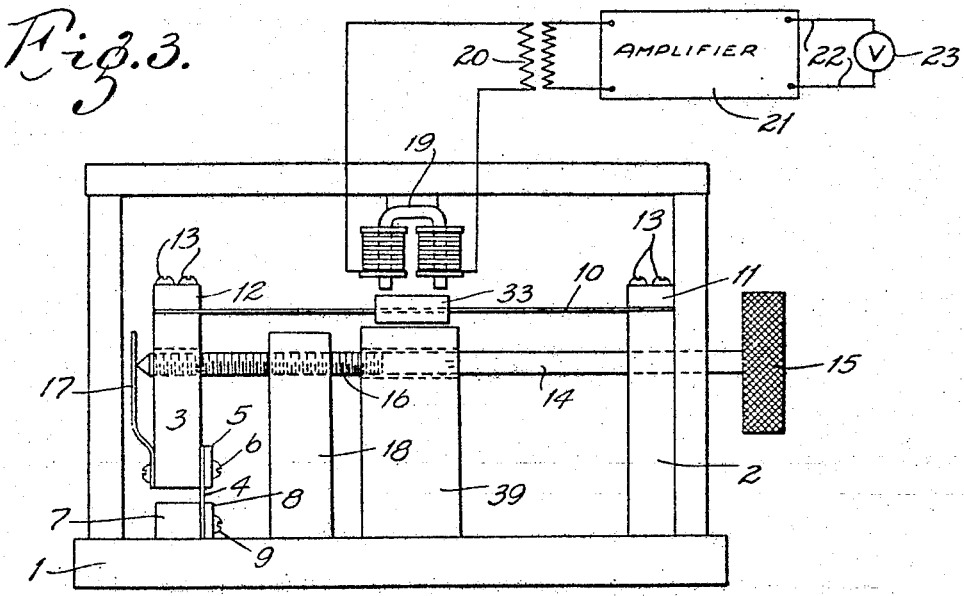
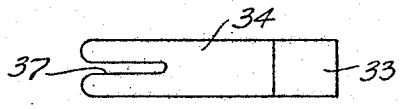
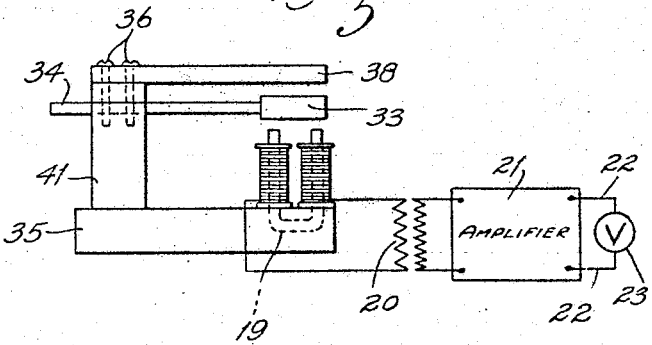
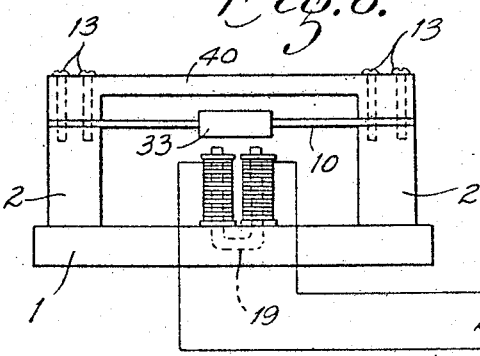

Patented Feb. 20, 1934

1,948,104

UNITED STATES PATENT OFFICE 1,948,104

VIBRATION RESPONSIVE APPARATUS

Floyd A. Firestone, Ernest J. Abbott, and Harvard B. Vincent, Ann Arbor, Mich.

Application October 24, 1929. Serial No. 402,259

11 Claims. (Cl. 181—0.5)

Our invention relates to apparatus for measuring vibration and particularly to apparatus wherein a reed armature tuned into resonance with the source of vibration generates an electric current in a circuit which is suitably coupled with amplifying and measuring apparatus. The principal object of the present invention is to devise means whereby the natural frequency of the reed armature may be varied without interfering with the vibration thereof, so that the armature may be brought into resonance with a particular frequency of vibration by varying the tuning thereof until the amplitude of vibration of said armature is a maximum. The invention consists principally in mounting the armature block at the middle of a vibratile reed that is fastened at both ends under longitudinal tension in combination with means for varying such tension. It also consists in the parts and in the arrangements and combinations of parts hereinafter described and claimed.

Figure 1:
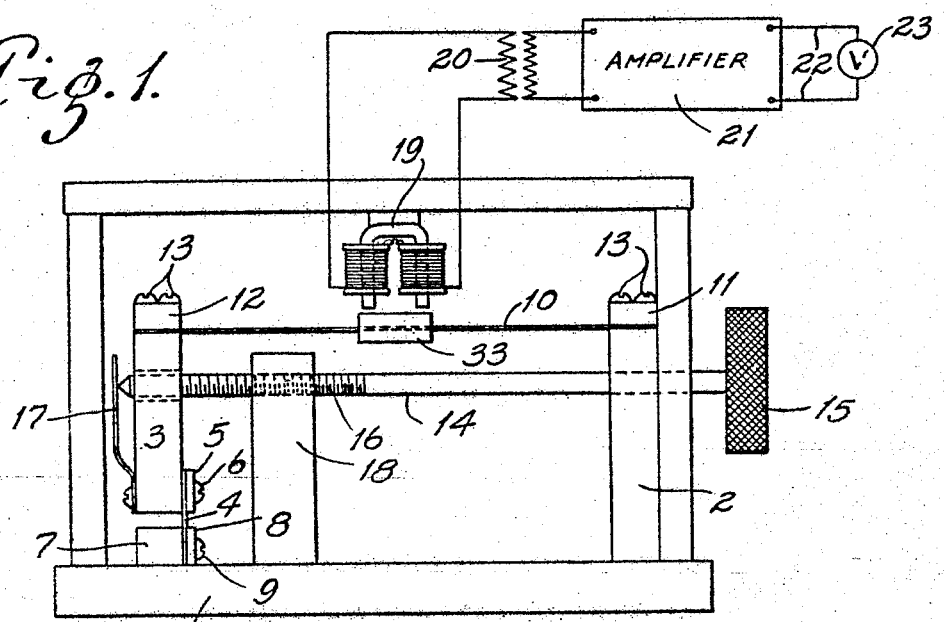
Figure 2:
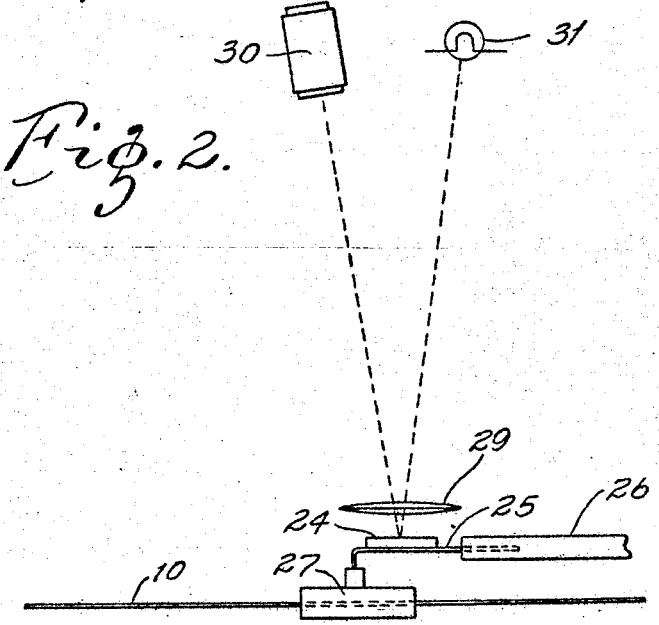

In the accompanying drawings wherein like numerals refer to like parts wherever they occur, Fig. 1 is a view of a sound or vibration responsive device conforming to our invention, Fig. 2 is a view of a modification of the measuring or indicating apparatus, Fig. 3 is a modified view of vibration responsive device, Fig. 4 is a detail view showing a reed with an elongated slot to permit longitudinal adjustment thereof, Fig. 5 is a view of a modification of vibration responsive device; and Fig. 6 is another modification of vibration responsive device.

The vibration responsive device shown in Fig. 1 of the accompanying drawings comprises a base 1 having a stationary supporting block 2 fixed thereto and a second supporting block 3 hinged at its lower end to said base by means of a thin strip 4 of elastic material such as spring steel, which is clamped at one end between said hinged supporting block 3 and the plate 5 fastened thereto by screw 6. The lower end of said spring strip is similarly clamped between a block 7 fixed to said base and a plate 8 by means of a screw 9. An elongated flat strip 10 of springy material, such as spring steel is clamped against the tops of said stationary block 2 and said hinged block 3 by means of clamping pieces 11, 12 secured to said stationary and hinged blocks respectively by screws 13. This spring strip 10 and mass 33 constitute a vibratile reed.

An elongated rod 14 with a knurled head 15 and with a threaded portion 16 extends loosely through alined openings in the supporting blocks 2 and 3, and its end bears against a flat spring 17 that is fastened to the outer side of said hinged block. Between the supporting blocks 2 and 3 is a third block 18 which is fixed to the base 1 and is provided with a threaded opening in which works the threaded portion 16 of said rod. By this arrangement, the threaded rod 14 exerts pressure against the spring 17 and therefore against the hinged supporting block 3 and consequently on the elongated strip 10 of springy material. The amount of tensile stress thus applied to the elongated strip 10 may be readily varied by turning the knurled head to move the screw rod 14 forward or backward.

Mounted on the middle portion of the reed or spring strip 10 is a piece of magnetic material 33 such as hardened steel, opposite the poles of a wound permanent magnet of horseshoe shape 19 in circuit with the primary winding 20 of an electrical transformer. The secondary winding of said transformer is coupled through a suitable electrical amplifier 21 to the circuit 22 of an electrical indicator, such as an ordinary voltmeter 23.

The operation of the apparatus is as follows: Base 1 of the vibration responsive device is preferably secured at a convenient location or adjacent to the mechanism whose vibration is to be measured. The natural frequency of the vibrating system of the kind above described is determined by its mass (which in the present device remains constant) and by the force required to deflect the mass unit distance from its position of equilibrium. In the construction described, the armature restoring force arises from the stiffness of the reed or spring strip 10 and depends upon its length, width, thickness and Young's modulus together with the controllable tensile stress applied to the strip 10 by means of the screw rod 14. The effect of the tensile stress applied by the screw rod is to stretch said strip 10 and raise the natural frequency of vibration thereof by an amount depending upon the tensile or stretching force applied thereto. This stretching force can be applied without otherwise interfering with the vibration of the reed.

If the mechanism on which the vibration responsive device is mounted vibrates with the frequency to which the reed is tuned, there will be a large amplitude of vibration of the armature 33 relative to the magnet 19. This will cause a variation in the air gap, an alternation of flux through said magnet and a generation of electromotive force in the coil or winding thereof, which is amplified by the amplifying apparatus and indicated by the voltmeter.

If, however, the natural frequency of the reed should not match the frequency of the incoming vibration, the response will be very small. In such case, the reed is brought into tune with the incoming vibration (if the frequencies are not too far different) by turning the knurled head, thus varying the tension in the leaf spring 17, which, acting through the hinged block 3, stretches the reed and thereby raises the natural frequency thereof, or reduces the tension on said reed and thereby lowers the natural frequency. The threaded rod is adjusted until the voltmeter or other indicator electrically coupled with the magnet winding shows a maximum response. When this adjustment is reached, the reed is in tune with the incoming vibration and this maximum reading of the meter is a measure of the intensity of the incoming vibration.

Our apparatus is especially useful in the measurement of noises produced by gears, roller bearings, electric motors or any other mechanism which produces a vibration of a definite frequency, as fully described in our copending application Serial No. 373,941 filed June 26, 1929. Since noise arises from the vibration of objects, the amount of noise produced thereby can be measured by measuring the amount of vibration of the surface which radiates it. As the speed of mechanism is liable to vary slightly, or the natural frequency of the reed is liable to change, it is a great advantage of our device that it is capable of adjustment sufficient to overcome the effects of such changes.

In the modification illustrated in Fig. 3, if desired, in order to dampen the vibration of the reed a heavy plate 39 is mounted on the base 1 to extend near the armature 33 as shown in the drawings.

It is well known that the maximum response and the shape of the frequency-response curve near resonance of a resonant system is largely determined by the rate of energy dissipation at the driven frequency. Hence the shape of the resonance curve can be very materially altered by adjusting the energy dissipation. By bringing the stationary damper 39 close to the vibrating reed, the energy is dissipated in overcoming the viscosity of the air particles in the small space between the reed and the damper plate.

In the modification illustrated in Fig. 2, the measuring or indicating system is optical as distinguished from the magneto-electric system of Fig. 1 and Fig. 3. According to such modification, a mirror 24 is mounted on an elastic hinge or spring strip 25, one end of which is mounted on a stationary support 26 and the other end of which is bent to contact with the block or mass 27 that is mounted on the tuned reed 10, contact being maintained by the flexibility of said spring strip. Opposite said mirror is mounted a stationary lens 29. An eye piece 30 and a lamp 31 are suitably located so that a ray of light radiated from the lamp will pass through the lens onto the mirror and be reflected therefrom back through said lens to the eye piece. The magnitude of the vibration of the reed may thus be readily observed by the shifting of the image of the light due to oscillation of the mirror as it follows the vibration of the reed.

In the modification illustrated in Fig. 5 the armature as shown is a piece of magnetic material 33 located opposite the poles of the horseshoe electromagnet and mounted on the end of an elongated flat spring 34 that is mounted on the same base as the electromagnet. Said spring thus constitutes a reed, and the effective length thereof may be varied either by shifting the armature endwise of the spring or in shifting the spring endwise on the supporting block 41. Such adjustment may be readily provided for by making a longitudinal elongated slot 37 in the end portion of the reed for the clamping screws 36 to pass through. In order to dampen the vibration of said reed a heavy plate 38 is mounted on said mounting block parallel with it; that is the reed armature is located between the electromagnet and said plate with air spaces intervening. Indicating apparatus is connected with electromagnet similarly to that described in connection with Figs. 1 and 3. It is obvious that if desired the damping plate 38 may be omitted.

In the modification illustrated in Fig. 6 two supporting blocks 2 are mounted at each end of the base 1, and mounted on the top thereof is the reed 10 which carries a piece of magnetic material 33 at its middle. On the top thereof is clamped a damper plate 40 together with the vibratile reed which is clamped to the supporting blocks 2 by the screws 13, as shown. The electromagnet 19 being attached to the base thereof leaving an air space at the top thereof between the armature 33 and the poles of the electromagnet. The electromagnet is connected to indicating apparatus as previously described and shown in the drawings.

What we claim is:

1. Vibration responsive apparatus comprising a thin elongated reed having a mass at the middle thereof, means for gripping the ends of said reed, said means being adjustable to tension said reed endwise and said reed being entirely free between said gripping means so as to be able to vibrate transversely without restraint, whereby said reed is capable of being tuned into resonance with an incoming vibration, and an indicator operatively related to said reed.

2. Vibration responsive apparatus comprising a magnet, an electrical circuit containing a winding around said magnet, a thin elongated reed with its ends secured and with the portion between said ends free so as to be transversely vibratile without restraint, said reed having a mass of magnetic material in position to constitute an armature for said magnet, means for varying the natural vibration frequency of said reed without otherwise interfering with the vibration thereof, an electrical amplifier coupled with said circuit and an electrical indicator operatively coupled to said amplifier.

3. Vibration responsive apparatus comprising a magnet, an electrical circuit containing a winding around said magnet, a thin elongated reed with its ends secured and with the portion between said ends free so as to be transversely vibratile without restraint, said reed having near its middle a mass of magnetic material in position to constitute an armature for said magnet, adjustable means for tensioning said reed, an electrical amplifier coupled with said circuit, and an electrical indicator operatively coupled to said amplifier.

4. Vibration responsive apparatus comprising a magnet, an electrical circuit containing a winding around said magnet, a thin elongated reed with its ends secured and with the portion between said ends free so as to be transversely vibratile without restraint, said reed having near its middle a mass of magnetic material in position to constitute an armature for said magnet, means for gripping the ends of said reed, an electrical amplifier coupled with said circuit and an electrical indicator operatively coupled to said amplifier.

5. Vibration responsive apparatus comprising a magnet, an electrical circuit containing a winding around said magnet, an elongated vibratile reed having near its middle a mass of magnetic material in position to constitute an armature for said magnet, means for holding one end of said reed, resilient means for holding the other end of said reed, said reed being free between said means, an adjustable means for tensioning said reed, an electrical amplifier coupled with said circuit and an electrical indicator operatively coupled to said amplifier.

6. Vibration responsive apparatus comprising a magnet, an electrical circuit containing a winding around said magnet, an elongated adjustable vibratile reed having only its ends secured and having a mass of magnetic material in position to constitute an armature for said magnet, a damping plate close to the vibratile reed, an electrical amplifier coupled with said circuit and an electrical indicator coupled to said amplifier.

7. Vibration responsive apparatus comprising a magnet, an electrical circuit containing a winding around said magnet, an elongated adjustable vibratile reed secured only at its ends and having a mass of magnetic material in position to constitute an armature for said magnet, a damping plate opposite said vibratile reed, and means for indicating the electromotive force generated in said circuit due to the changes of magnetic flux produced by movements of said armature.

8. Vibration responsive apparatus comprising a magnet, an electrical circuit containing a winding around said magnet, an elongated vibratile reed secured only at its ends and having a mass of magnetic material in position to constitute an armature for said magnet, a damping plate close to the vibratile reed, an electrical amplifier coupled with said circuit, and an electrical indicator operatively coupled to said amplifier.

9. Vibration responsive apparatus comprising a magnet, an electrical circuit containing a winding around said magnet, an elongated vibratile reed secured at its ends only and having a mass of magnetic material in position to constitute an armature for said magnet, means for damping vibrations of said vibratile reed, an electrical amplifier coupled with said circuit and an electrical indicator operatively coupled to said amplifier.

10. Sound responsive apparatus comprising an elongated transversely vibratile reed secured at its ends only and having a mass near its middle, means for holding one end of said reed, resilient means for holding the other end of said reed, adjustable means for tensioning said reed, and an indicator operatively related to said reed.

11. Sound responsive apparatus comprising an elongated tranversely vibratile reed secured at its ends only and having a mass near its middle, a damping plate placed in position to dampen the vibrations of said reed, adjustable means for tensioning said reed, and an indicator operatively related to said reed.

FLOYD A. FIRESTONE.
ERNEST J. ABBOTT.
HARVARD B. VINCENT.